Nov. 19, 1940.                R. SIMMON                    2,222,185
                         PHOTOGRAPHIC ENLARGER
                         Filed April 19, 1940           2 Sheets-Sheet 1
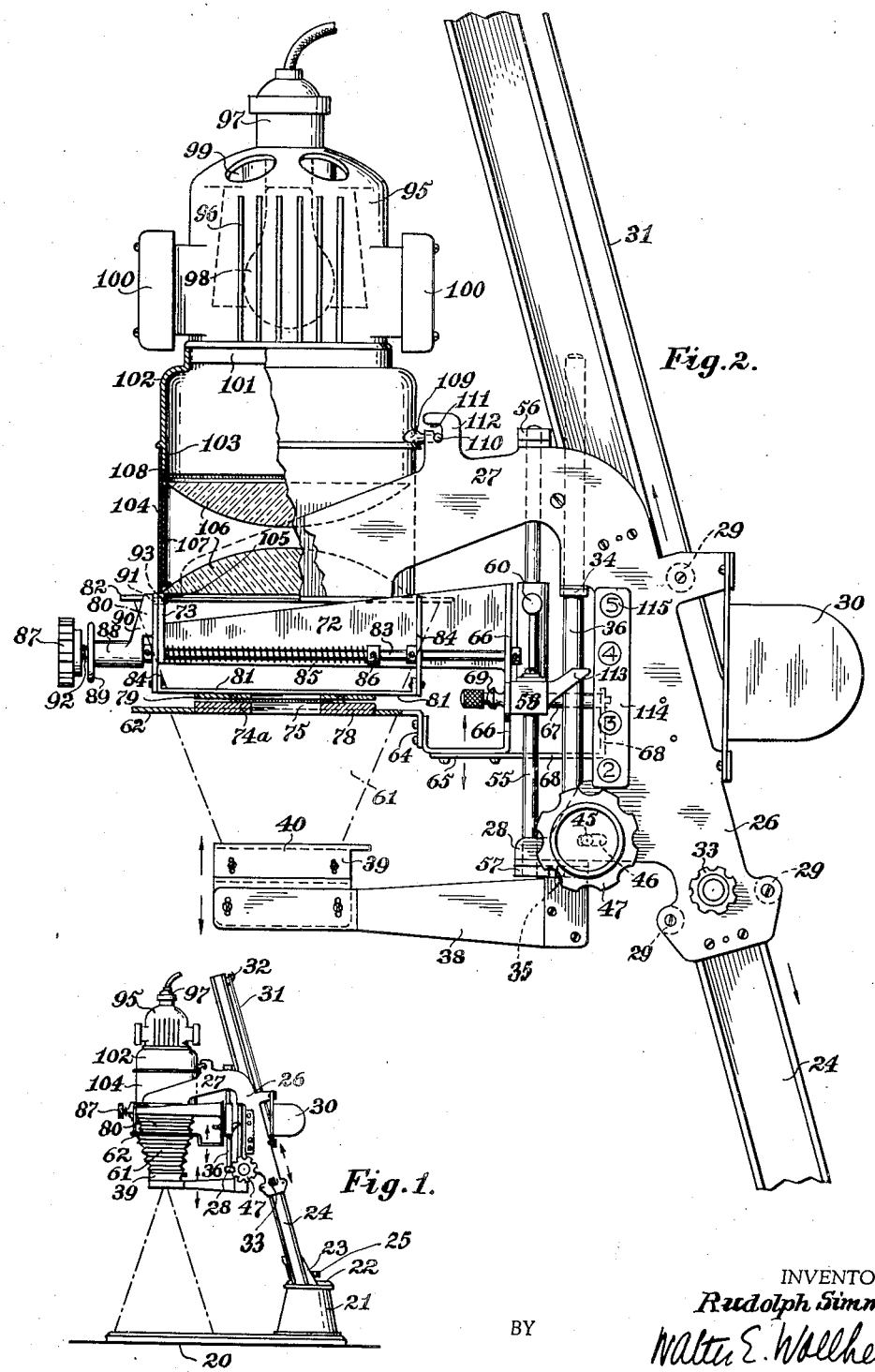
INVENTOR:
Rudolph Simmon
BY Walter E. Wallheim
ATTORNEY.

Nov. 19, 1940.  R. SIMMON  2,222,185
PHOTOGRAPHIC ENLARGER
Filed April 19, 1940  2 Sheets-Sheet 2
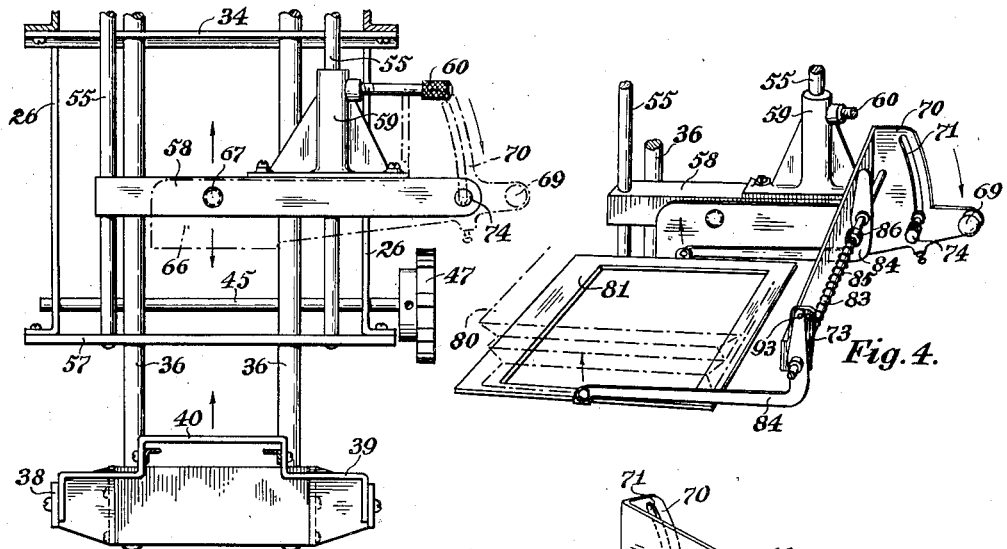
Fig.3.
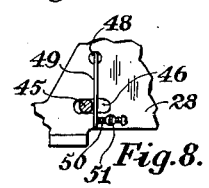
Fig.8.
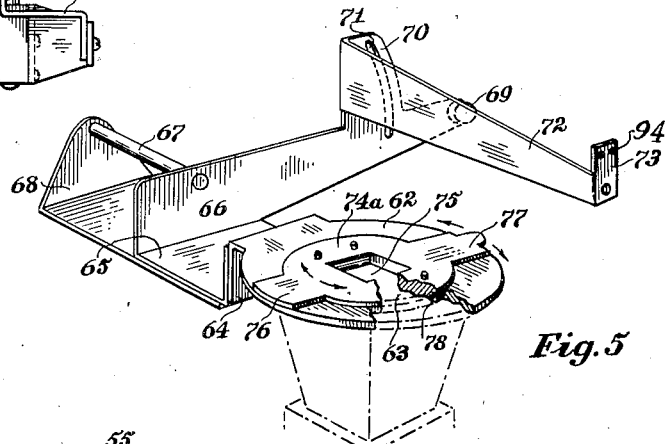
Fig.6.
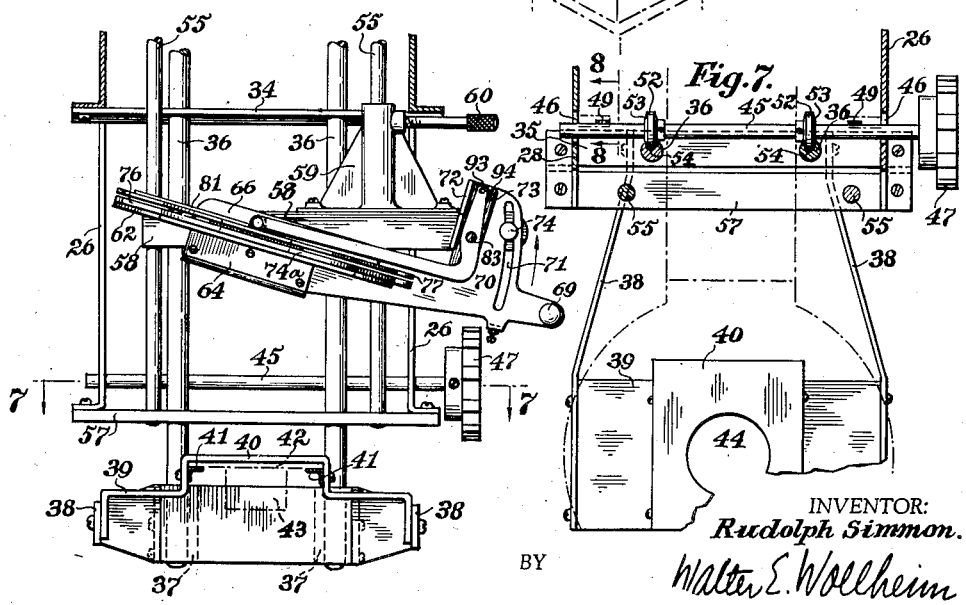
INVENTOR:
Rudolph Simmon.
BY Walter E. Wollheim
ATTORNEY.

Patented Nov. 19, 1940

2,222,185

UNITED STATES PATENT OFFICE 2,222,185

PHOTOGRAPHIC ENLARGER

Rudolph Simmon, Jackson Heights, N. Y.

Application April 19, 1940, Serial No. 330,503

16 Claims. (Cl. 88—24)

The size of the condenser lenses in the type of photographic enlarger described in my co-pending application, Serial #316,729, filed February 1, 1940, must be considerably larger in diameter than the diagonal of the negative. Inasmuch as the relation between enlarging lens and condenser lenses is fixed in such an enlarger, and focusing is obtained only by moving the negative, it is obvious that where the negative is fairly large, the condenser lenses must be proportionately large. This greatly increases the cost of manufacture of enlargers of such a type in which a set of condenser lenses must be employed large enough for use with the largest negative over the entire range of the focusing movement.

It is the principal object of this invention to provide in an enlarger of the type specified, means to enable the instrument to handle fairly large sized negatives without the cost of extra large condenser lenses, at the same time retaining all of the advantages of an enlarger of the kind covered in the aforesaid application.

I accomplish this object by providing in an enlarger novel means which permit not only so-called "negative focusing," but also "lens focusing" in a structure essentially the same as that of my co-pending application, that is one which lends itself to the use of interchangeable lenses of long or short focal lengths and one in which complete distortion control can be obtained.

In brief, I attain the desired results by furnishing in an enlarger head a source of light, a set of medium sized condenser lenses, an adjustable negative holder, immediately below the condenser lenses in case of larger negatives, but far enough away from the lenses to permit tilting of such large negatives, and an enlarging lens adjustably disposed with respect to the negative and condenser lenses. It is then possible to "rough" focus by means of adjustment of the negative and "fine" focus by shifting the enlarging lens.

In an enlarger made according to my co-pending application which ordinarily will accommodate negatives up to 2¼ x 2¼ in size, condenser lenses 5" in diameter are used. For negatives 3¼ x 4¼ in size, condenser lenses of at least 8" in diameter would be needed. However, by modifying the construction as hereinafter described, I am able to use condenser lenses of only 6½" in diameter with such large negatives resulting in decided economies in manufacture, compactness of construction and corresponding decrease in weight without sacrificing any of the advantageous characteristics of this type of enlarger.

Other objects will become apparent in the following specification and the accompanying drawings in which a preferred embodiment of the invention is described and shown.

In the drawings:

Fig. 1 is a side elevational view of an enlarger embodying the principles of the inventions;

Fig. 2 is an enlarged fragmentary side view, partly in section, of the movable carriage or head of the enlarger;

Fig. 3 is a fragmentary front elevational view, partly in section, of a portion of the guiding mechanism for the carriage and negative holder support, the tilting mechanism for the negative holder, bellows and other details having been omitted;

Fig. 4 is a fragmentary perspective view of portions of the negative holder mounted on its support and of the guiding mechanism shown in Fig. 3;

Fig. 5 is a fragmentary perspective view of the negative holder support and its fastening to the frame of the carriage;

Fig. 6 is a fragmentary elevational front view, partly in section, of the mechanism shown in Fig. 3 with the negative holder in place and shown tilted at an angle, but the bellows being omitted.

Fig. 7 is a fragmentary horizontal sectional view, partly in elevation, taken along the plane of line 7—7 in Fig. 6; and Fig. 8 is a detail sectional view taken along the plane of line 8—8 in Fig. 7.

Like characters of reference denote similar parts throughout the several views and the following specification.

20 is a baseboard at one extremity of which is located a pedestal 21 having rotatably fastened upon it a turntable 22 with upturned lugs 23, to each of which girders 24 of substantially U cross sections are secured. A lock screw 25 fastens the turntable 22 to the pedestal 21 in any desired position. Girders 24 are inclined forwardly over the baseboard and have their tops preferably connected by cross or stringer pieces (not shown). It is obvious that the entire girder assembly can be swiveled upon the pedestal 21 by rotating the turntable 22.

26 are frame members for a focusing carriage at both sides of the girder assembly. Each frame member is substantially U-shaped having a relatively long upper leg 27 and a relatively short lower leg 28. 29 are rollers secured to the frame members 26 and riding upon opposed end faces of the girders 24, thus slidingly supporting the carriage upon the girder assembly. At the side of each frame member 26 is a housing 30 within which is coiled, and fastened upon a suitable shaft, a steel spring tape 31, one free end of which is passed through a slot in the wall of the housing and is fastened to a hook 32 at the top of the girders 24, providing a counterbalance for the focusing carriage.

33 is a lock screw at the outside of one of the frame members 26 and projecting therethrough to force a block or other means (not shown) against the girder, thus effectively clamping the focusing carriage in any desired position, essentially the same as described and shown in my co-pending application Serial #316,729, above referred to.

Slidably supported within plate 34 across and near the top of frame members 26 and within plate 35 at the bottom of legs 28, are two parallelly disposed guide rods 36. The bottom ends of guide rods 36 are securely fastened to square sockets 37, at the side of which are attached support brackets 38 for a lens carrier, which consists of a plate 39 having a central raised portion 40, on the underside of which are angle plates 41 to removably support a lens board 42 carrying a lens 43 of a construction well known in the art coaxially below an aperture 44 in the center of the raised portion 40 of plate 39.

45 is a transversely disposed lens focusing shaft journaled within oblong holes 46 in lower legs 28 of frame members 26, as shown in Fig. 7. One end of the shaft projects beyond one of the frame members 26 and is provided with a hand wheel 47. From studs 48 in opposed faces of members 26 leaf springs 49 are suspended which are forced against shaft 45 by adjusting screws 50 in studs 51, as clearly shown in detail Figure 8; for the purpose of having wheels 52 with tapered sides 53 and keyed to the shaft, frictionally engage the sides of grooves 54 in guide rods 36. By turning hand wheel 47, the guide rods 36 are either raised or lowered for lens focusing, as will be explained more in detail hereafter, by the friction exerted by the wheels 52 against the rods, respectively, their grooves 54.

55 are two parallelly disposed rods having their top ends securely fastened to a plate 56 across legs 27 of frame members 26, and their bottom ends secured to a plate 57 across legs 28. 58 is a support plate across rods 55 and slidably disposed thereupon, having a vertical bracket extension 59 in sliding engagement with one of the rods and adjustably secured thereto by a set screw 60, thus permitting the support plate 58 to be pushed up or down upon rods 55.

61 are lower bellows fastened with their bottom around opening 44 in plate 39 and with their top to a film holder table 62, having a round opening 63. The back of the table 62 is bent downwardly at 64 and extended rearwardly at 65, terminating in an upturned flange 66 fastened to a shaft 67 which extends rearwardly through support plate 58 and is rotatably mounted therein. The extreme rearwardly projecting end of shaft 67 is supported by an L-shaped bracket 68 forming an extension of part 65 of the table 62.

Flange 66 is extended at one side to terminate in a handle knob 69, and has further an upwardly projecting extension 70 with an arcuate slot 71 having shaft 67 as its center. One side of extension 70 is bent frontwardly and at right angles forming a leg 72, the front terminal of which is bent over parallel to extension 70 forming a bracket 73. 74 is a set screw through slot 71 screwed into support plate 58.

74a is a bottom plate of a film holder having an opening 75 to correspond to the size of the picture upon a film. 76 and 77 are lateral projections from the plate to facilitate its handling. 78 is a round extension at the bottom of plate 74a fitting the round opening 63 of table 62. 79 is an apertured top plate of the film holder in doweled engagement with the bottom plate 74a.

80 are upper bellows, the bottom of which are secured to an apertured pressure plate 81 adapted to compress the film holder, and the top of which is fastened to an apertured support plate 82 fastened to the bottom of and between upper legs 27 of frame members 26.

83 is a shaft journaled between extension 70 and bracket 73 of flange 66. L-shaped levers 84, rigidly connected to shaft 83, are pivotally mounted upon both sides of pressure plate 81. A retractile coiled spring 85 around shaft 83, fastened to bracket 73 at one end and to a bushing 86 secured upon the shaft, tends to keep the pressure plate in close contact with the film holder. A hand wheel 87 is fastened to that end of the shaft which projects forwardly of bracket 73. 88 is a trigger slidingly mounted upon shaft 83 between hand wheel 87 and one of the levers 84, having a finger plate 89, an arm 90 and a pin 91. A spring 92 around shaft 83 is interposed between hand wheel 87 and finger plate 89. Hand wheel 87 is turned until the pin 91 in arm 90 engages through an opening 93, a hole 94 in bracket 73 which it enters by force of the spring 92. In this position the pressure plate 81 is held off the film or negative holder in which the film can then be changed. Should it be desired to have the pressure plate 81 bear down again upon the negative holder, it is only necessary to force the finger plate 89 of the trigger 88 against the hand wheel 87 to disengage the pin 91 from hole 94 in bracket 73 when the action of the spring 85 forces the levers 84, and thus the plate 81, against the negative holder.

By rotating the handle knob 69 about shaft 67 as an axis, the entire pressure plate release mechanism, as well as the film holder, can be given an angular position as shown in Fig. 6, which is limited by the extent of the slot 71 and locked in a selected position for purposes explained hereafter.

95 is a substantially cylindrical lamp housing with air cooling fins 96 at its outside. A lamp socket 97 holding an electric bulb 98 is provided for at the top of the housing. The bulb is suitably shielded. The top of the housing has passages 99 and annular spaces around caps 100 at the side of the housing to permit air to circulate therethrough. A circular bottom 101 of the housing 95 fits into an adapter 102 which is enlarged in diameter at 103 to fit a cylindrical condenser housing 104 which is flanged inwardly at 105 and rests upon the apertured support plate 82. A pair of condenser lenses 106 are held within the housing in definite relation to each other by a spacer 107. 108 is an annular washer upon the top condenser lens pressed into the housing. The back of the adapter 102 has attached to it by lugs 109 a horizontally disposed rod 110, the ends of which are adapted to rest within substantially L-shaped slots 111 in extensions 112 at the top of each of the frame members 26, serving as a hinge for the lamp housing and condenser unit. By virtue of the L-shaped slots, the hinge rod 110 can readily be slipped out of engagement with the frame members 26, and thus the entire housing, adapter and condenser unit can quickly be removed from the assembly.

At the back of the support plate 58 is an indicator 113 pointing towards a plate 114 mounted at the side of one of the frame members 26. The plate 114 is provided with numbers 2, 3, 4 and 5 as at 115 to identify the position of the plate 58 with different lenses of 2″, 3″, 4″ or 5″ focal length.

In the ordinary use of the enlarger, the film is inserted within plates 74 and 79 of the film holder, while the pressure plate 81 is raised by bringing pin 91 in engagement with hole 94 in bracket 73. In this position the operator has the free use of both his hands. After the film has been properly placed, and attention is particularly drawn to the fact that the holder can be rotated about itself to assume any desired position, pressure plate 81 is allowed to bear down upon the film holder by pressing finger plate 89 against hand wheel 87 and thus release the pin 91 from engagement with hole 94 in bracket 73, as previously explained. With the bulb 98 switched on, the image can be projected upon the baseboard 20 or easel.

By moving the carriage which contains the lamp, lenses, film and focusing arrangement, up and down the girders 24, the approximate size of the image can be determined, and by tightening the hand wheel of lock screw 33, the position of the carriage can be fixed accordingly. I then raise or lower support plate 58 by hand until the indicator 113 registers with that number on indicator plate 114 which corresponds with the focal length of the enlarging lens 43 in use and lock the plate in such a position by set screw 60. In order to bring the picture upon the film in final and sharp focus, I turn hand wheel 47 clock or counter clockwise which in turn raises or lowers the lens board and lens. It is apparent now that by adjusting in the carriage the position of the support plate 58 which carries the film holder with it, I "rough" focus the picture, while by adjusting the lens after "rough" focusing, I "fine" focus the picture.

The enlarger is especially adapted to correct distortion. The principles of distortion control are explained in detail in my co-pending application above referred to. By the use of a hinged easel the same method can be practiced with the instant structure. This method requires the convenient tilting of the negative and projecting it upon a baseboard or easel tilted at an angle opposite to that of the negative. Tilting is accomplished by rotating the handle knob 69 about shaft 67 whereby the entire film holder as well as the pressure plate release mechanism is given any desired angle to the extent of the slot 71, in which position it can then be locked.

While I have shown bellows between the condensers, film holder, and lens, other forms of flexible means may be employed, and the term "bellows" is not to be interpreted narrowly, but where used is to cover any other form of chamber having flexible or self-adjusting walls, or may even cover a light proof housing only over the essential parts of the carriage.

Instead of a pair of condensers, any other suitable member may be used. For an easel, any convenient form of paper holder or support may be employed which can be separate or integral with the baseboard.

It is obvious therefore that many changes of form, proportions and minor details of construction may be resorted to without departing from the principles or sacrificing any of the advantages of the invention as defined in the appended claims.

What I claim as new is:

1. In a photographic enlarger for use with enlarging lenses of different focal lengths, a main support, a carriage movable thereupon, a lamp housing and a condenser unit connected to the top of said carriage, holding means for selectively receiving one of the lenses of different focal lengths adjustably connected to the bottom of said carriage, a negative holder, tilting means for said holder, a support in said carriage, independently adjustable from said lens holding means and movable in a direction parallel to the optical axis of the enlarger for said holder and tilting means, markings on said carriage indicative of various focal lengths of lenses usable in the enlarger, and means to bring said support in the carriage in register with that one of said markings which corresponds with the focal length of the lens placed in said holding means.

2. In a photographic enlarger for use with enlarging lenses of different focal lengths, a main support, a carriage movable thereupon, a lamp housing and a condenser unit connected to the top of said carriage, a removable enlarging lens adjustably connected to the bottom of said carriage, a laterally rotatable negative holder, tilting means for said holder, a support in said carriage, independently adjustable from said lens and movable in a direction parallel to the optical axis of the enlarger, for said holder and tilting means, markings on said carriage indicative of various focal lengths of lenses usable in the enlarger, and means to bring said support in the carriage in register with that one of said markings which corresponds with the focal length of said enlarging lens.

3. In a photographic enlarger, a support consisting of two parallelly disposed girders, a carriage movable thereupon comprising frame members in sliding engagement with said girders, a lamp housing and a condenser unit at the top of said carriage and supported between said frame members, an enlarging lens near the bottom of said carriage between said frame members and adjustably connected thereto, a negative holder, tilting means for said holder, and a support between said frame members, independently adjustable from said lens and movable in a direction parallel to the optical axis of the enlarger, for said holder and tilting means.

4. A photographic enlarger comprising a main support, a movable carriage thereupon, a lamp housing and a condenser unit connected to the top of said carriage, an enlarging lens connected to the bottom of said carriage, bellows between said condenser unit and lens, a laterally rotatable negative holder across said bellows, a seat plate for said holder, a releasable pressure plate upon said holder, tilting means for said holder, seat plate and pressure plate, a support in said carriage for said seat and pressure plates adjustable with respect to said condenser unit and lens and movable in a direction parallel to the optical axis of the enlarger, and means to adjust the said lens independently from the support in said carriage.

5. A focusing carriage for a photographic enlarger consisting of spaced frame members adapted slidingly to engage a main support, a lamp housing and a condenser unit at the top of the carriage and supported between said frame members, a rotatable negative holder, tilting means for said holder, rods fixedly secured to said frame members, a support plate, in sliding engagement with said rods and movable in a direction parallel to the optical axis of the enlarger, for said holder and tilting means, a pair of parallelly disposed guide bars slidingly secured to top and bottom parts of said frame members, a bracket at the bottom of said guide bars, a removable enlarging lens in said bracket, and mechanism to raise and lower said guide bars and lens, independently of said support plate.

6. A focusing carriage for a photographic enlarger comprising spaced frame members adapted slidingly to engage a main support, a lamp housing and a condenser unit connected to the top of the carriage, an enlarging lens connected to the bottom of said carriage, bellows between said condenser unit and lens, a laterally rotatable negative holder across said bellows, a seat plate for said holder, a releasable pressure plate upon said holder, tilting means for said holder, seat and pressure plates, rods fixedly secured to said frame members, a support plate for said holder, seat and pressure plates and tilting means, slidingly engaging said rods and movable in a direction parallel to the optical axis of the enlarger, guide bars slidingly secured to said frame members and carrying supporting means for said lens, and mechanism to raise and lower said guide bars and lens independently of said support plate.

7. A focusing carriage for a photographic enlarger for use with enlarging lenses of different focal lengths, comprising frame members slidingly engaging a main support, a lamp housing and a condenser unit connected to the top of the carriage, a removable enlarging lens connected to the bottom of said carriage, a laterally rotatable negative holder, tilting means for said holder, rods fixedly secured to said frame members, a support plate for said holder and tilting means, slidingly engaging said rods and movable in a direction parallel to the optical axis of the enlarger, markings on said frame members indicative of various focal lengths of lenses usable in the enlarger, and means to bring said support plate in register with that one of said markings which corresponds with the focal length of said enlarging lens.

8. A focusing carriage for a photographic enlarger for use with enlarging lenses of different focal lengths, comprising frame members slidingly engaging a main support, a lamp housing and a condenser unit connected to the top of the carriage, a removable enlarging lens connected to the bottom of said carriage, a laterally rotatable negative holder, tilting means for said holder, rods fixedly secured to said frame members, a support plate for said holder and tilting means, slidingly engaging said rods and movable in a direction parallel to the optical axis of the enlarger, markings on said frame members indicative of various focal lengths of lenses usable in the enlarger, means to bring said support plate in register with that one of said markings which corresponds with the focal length of said enlarging lens for "rough" focusing, and means to adjust the position of said enlarging lens independently from said support plate for "fine" focusing.

9. A focusing carriage for a photographic enlarger for use with enlarging lenses of different focal lengths, comprising frame members slidingly engaging a main support, a lamp housing and a condenser unit connected to the top of said members, a removable enlarging lens connected to the bottom of said members, bellows between said condenser unit and lens, a laterally rotatable negative holder across said bellows, clamping and tilting means for said holder, rods fixedly secured to said frame members, a support plate for said holder, clamping and tilting means, slidingly engaging said rods and movable in a direction parallel to the optical axis of the enlarger, markings on said frame members indicative of various focal lengths of lenses usable in the enlarger, means to bring said support plate in register with that one of said markings which corresponds with the focal length of said enlarging lens for "rough" focusing, and means to adjust the position of said lens independently from said support plate for "fine" focusing.

10. A focusing carriage for a photographic enlarger for use with enlarging lenses of various focal lengths, comprising frame members slidingly engaging a main support, a lamp housing and a condenser unit connected to the top of said members, a lens bracket connected to the bottom of said frame members and a removable enlarging lens carried by said bracket, bellows between said condenser unit and lens bracket, a laterally rotatable negative holder across said bellows, clamping and tilting means for said holder, rods fixedly secured to said frame members, a support plate for said holder, clamping and tilting means, slidingly engaging said rods and movable in a direction parallel to the optical axis of the enlarger, markings on said frame members indicative of various focal lengths of lenses usable in the enlarger, means to bring and fix said support plate in register with that one of said markings which corresponds with the focal length of said enlarging lens for "rough" focusing, guide bars slidingly secured to said frame members and rigidly fastened to said lens bracket, and mechanism to raise and lower said guide bars and lens bracket with lens independently of said support plate for "fine" focusing.

11. A focusing carriage for a photographic enlarger for use with enlarging lenses of various focal lengths, comprising frame members slidingly engaging a main support, a lamp housing and a condenser unit connected to the top of said frame members, a lens bracket connected to the bottom of said frame members and a removable enlarging lens carried by said bracket, bellows between said condenser unit and lens bracket, a laterally rotatable negative holder across said bellows, a seat plate for said holder, a releasable pressure plate upon said holder, tilting means for said holder, rods fixedly secured to said frame members, a support plate for said holder, seat plate, pressure plate and tilting means, slidingly engaging said rods and movable in a direction parallel to the optical axis of the enlarger, markings on said frame members indicative of various focal lengths of lenses usable in the enlarger, means to bring and fix said support plate in register with that one of said markings which corresponds with the focal length of said enlarging lens for "rough" focusing, guide bars slidingly secured to said frame members and rigidly fastened to said lens bracket, and mechanism to raise and lower said guide bars and lens bracket with lens independently of said support plate for "fine" focusing.

12. In a photographic enlarger, a main support, a carriage movable thereupon, a lamp housing and a condenser unit connected to the top of said carriage, holding means connected to the bottom of said carriage for selectively receiving one of lenses of different focal lengths, a negative holder, tilting means for said holder, a support in said carriage for said holder and tilting means, means to adjust the position of said lens holding means with respect to the said condenser unit, and means to adjust the position of said holder support with respect to said condenser unit and said lens holding means independently of said lens holding means, the said holder support and lens holding means being movable in a direction parallel to the optical axis of the enlarger.

13. In a photographic enlarger, a main support, a carriage movable thereupon, a lamp housing and a condenser unit connected to the top of said carriage, holding means connected to the bottom of said carriage for selectively receiving one of lenses of different focal lengths, a laterally rotatable negative holder, tilting means for said holder, a support in said carriage for said holder and tilting means, means to adjust the position of said lens holding means with respect to the said condenser unit, and means to adjust the position of said holder support with respect to said condenser unit and said lens holding means independently of said lens holding means, the said holder support and lens holding means being movable in a direction parallel to the optical axis of the enlarger.

14. In a photographic enlarger, a main support, a carriage movable thereupon, a lamp housing and a condenser unit connected to the top of said carriage, holding means connected to the bottom of said carriage for selectively receiving one of lenses of different focal lengths, bellows between said condenser unit and lens holding means, a laterally rotatable negative holder, tilting means for said holder, a support in said carriage for said holder and tilting means, means to adjust the position of said lens holding means with respect to the said condenser unit, and means to adjust the position of said holder support with respect to said condenser unit and said lens holding means independently of said lens holding means, the said holder support and lens holding means being movable in a direction parallel to the optical axis of the enlarger.

15. In a photographic enlarger for use with enlarging lenses of different focal lengths, a main support, a carriage movable thereupon, a lamp housing and a condenser unit connected to the top of said carriage, holding means connected to the bottom of said carriage for selectively receiving one of the lenses of different focal lengths, a negative holder, tilting means for said holder, a support in said carriage for said holder and tilting means, means to adjust the position of said lens holding means with respect to the said condenser unit, means to adjust the position of said holder support with respect to said condenser unit and said lens holding means independently of said lens holding means, the said holder support and lens holding means being movable in a direction parallel to the optical axis of the enlarger, markings on said carriage indicative of various focal lengths of lenses usable in the enlarger, and means to bring said holder support in register with that one of said markings which corresponds with the focal length of the lens placed in said holding means.

16. In a photographic enlarger, a main support, a carriage movable thereupon, a lamp housing and a condenser unit connected to the top of said carriage, holding means connected to the bottom of said carriage for selectively receiving lenses of different focal lengths, a negative support intermediate said condenser unit and lens holding means, means to adjust the position of said lens holding means with respect to said condenser unit, and means to adjust the position of said negative support with respect to said condenser unit and lens holding means, the said negative support and lens holding means being movable in a direction parallel to the optical axis of the enlarger, and the said condenser unit having the same focal length and diameter for lenses of different focal lengths placed within said lens holding means.

RUDOLPH SIMMON.